Oct. 6, 1942.   L. A. KILGORE ET AL   2,298,134
SHIP PROPULSION SYSTEM
Filed April 15, 1941     2 Sheets-Sheet 1

WITNESSES:
Wm. B. Sellers
Nm. C. Groome

INVENTORS
Lee A. Kilgore and
Erling Frisch.
BY Paul E. Friedemann
ATTORNEY

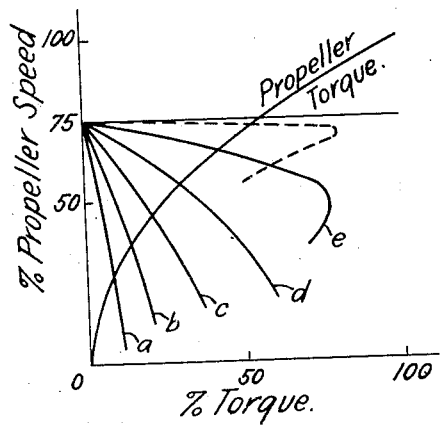
Fig. 2.
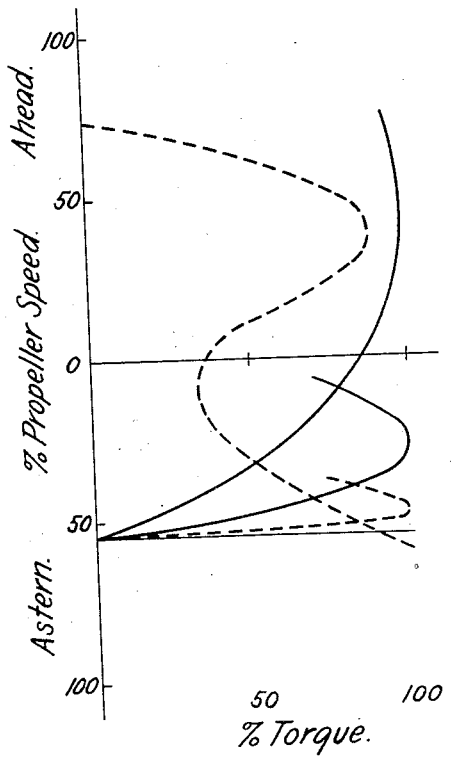
Fig. 3.
Fig. 4.
| Sw. No. | Ahead | Stop | Astern |
|---|---|---|---|
| 1M | | | O |
| 2M | O | | |
| 3M | O | | O |
| 4M | O | | |
| 5M | | | O |
Fig. 5.
| Sw. No. | Ind. Motor | | | | | 1I | 2I | 3I | Syn. Motor | | | | |
|---|---|---|---|---|---|---|---|---|---|---|---|---|---|
| | a | b | c | d | e | | | | f | g | h | i | j |
| 1A | O | O | O | O | | | | | | | | | |
| 2A | | O | O | O | O | | | | O | O | O | O | O |
| 3A | | | O | O | O | | | | O | O | O | | |
| 4A | | | | O | O | | | | O | O | | | |
| 5A | | | | | O | O | | | | | | | |
| 1F | | | | | | | O | O | O | O | O | O | O |
| 2F | | | | | | | O | O | O | O | O | | |
| 3F | O | O | O | O | O | O | | | O | O | O | | |
| 4F | O | O | O | O | O | | | | O | O | O | O | O |
| 5F | | | | | | O | O | O | | | | | |
| 6F | | | | | | | O | O | O | O | O | O | O |
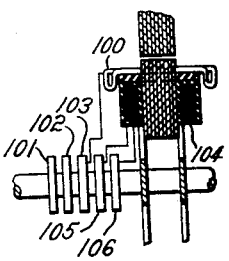
Fig. 6.

Patented Oct. 6, 1942

2,298,134

UNITED STATES PATENT OFFICE 2,298,134

SHIP PROPULSION SYSTEM

Lee A. Kilgore, Forest Hills, and Erling Frisch, Pittsburgh, Pa., assignors to Westinghouse Electric & Manufacturing Company, East Pittsburgh, Pa., a corporation of Pennsylvania Application April 15, 1941, Serial No. 388,602

5 Claims. (Cl. 290—17)

Our invention relates generally to power systems but more particularly to power systems for use on board ships for operating the propulsion apparatus and the auxiliary electric energy consuming equipment.

On certain types of electrically propelled vessels, as, for example, self-unloading ore carriers, or cargo vessels with refrigerating plants, where a large amount of auxiliary power is required both at the dock and when the vessel is under way, it is very desirable, from the standpoint of economy and the saving of cargo space, to use the main propulsion generators to furnish the auxiliary power load rather than to install auxiliary generators of sufficient capacity to take care of this load.

As the main generators will furnish auxiliary power also when the vessel is under way, the frequency of these main generators must not be reduced to any appreciable extent below the normal frequency. A reduction in speed to 75% of the normal speed is usually permissible. Where the most, or greatest economy, is to be obtained from a single main generator for all the electrical equipment on board ship, a synchronous motor drive is out of the question, because the propeller speed must be reduced considerably below 75% of the maximum speed for maneuvering purposes.

With previous attempts to use a single large main generator for all electrical equipment on board the type of ship mentioned, induction motors were used for the propeller drive. Induction motors, suitable for this type of service, however, have a very poor power factor and the size and weight of motor and generator, or motors and generators, will in consequence be increased to such an extent that the advantages to be gained by the elimination of the auxiliary generators to a large extent will be offset.

One object of our invention is the provision of a power system for use on board ship that shall have a minimum of weight.

Another object of our invention is the provision of a single main source of electric energy on board ship for supplying uninterruptedly all auxiliaries and the propulsion equipment of a ship and do so at a high efficiency of all electrical machines used.

A more specific object of our invention is the provision of a synchronous-induction motor propulsion drive whereby high overall efficiency may be obtained since the generated alternating current for the auxiliaries and the propulsion drive need never be reduced below a given selected value.

The objects hereinbefore stated are merely illustrative but many other objects will, no doubt, become apparent from a study of the following specification and the accompanying drawings, in which:

Fig. 2 shows speed-torque curves of a synchronous-induction motor, such as we use, for the induction motor range of operation, which curves are shown in relation to the propeller torque curve;

Fig. 3 shows the torque changes of the motor during rapid reversal in relation to the reversing torque of a propeller;

Figs. 4 and 5 are sequence tables showing the order in which the various switches of our control are operated; and Fig. 6 is a schematic showing of a synchronous motor provided with a starting winding.

Figure 1:
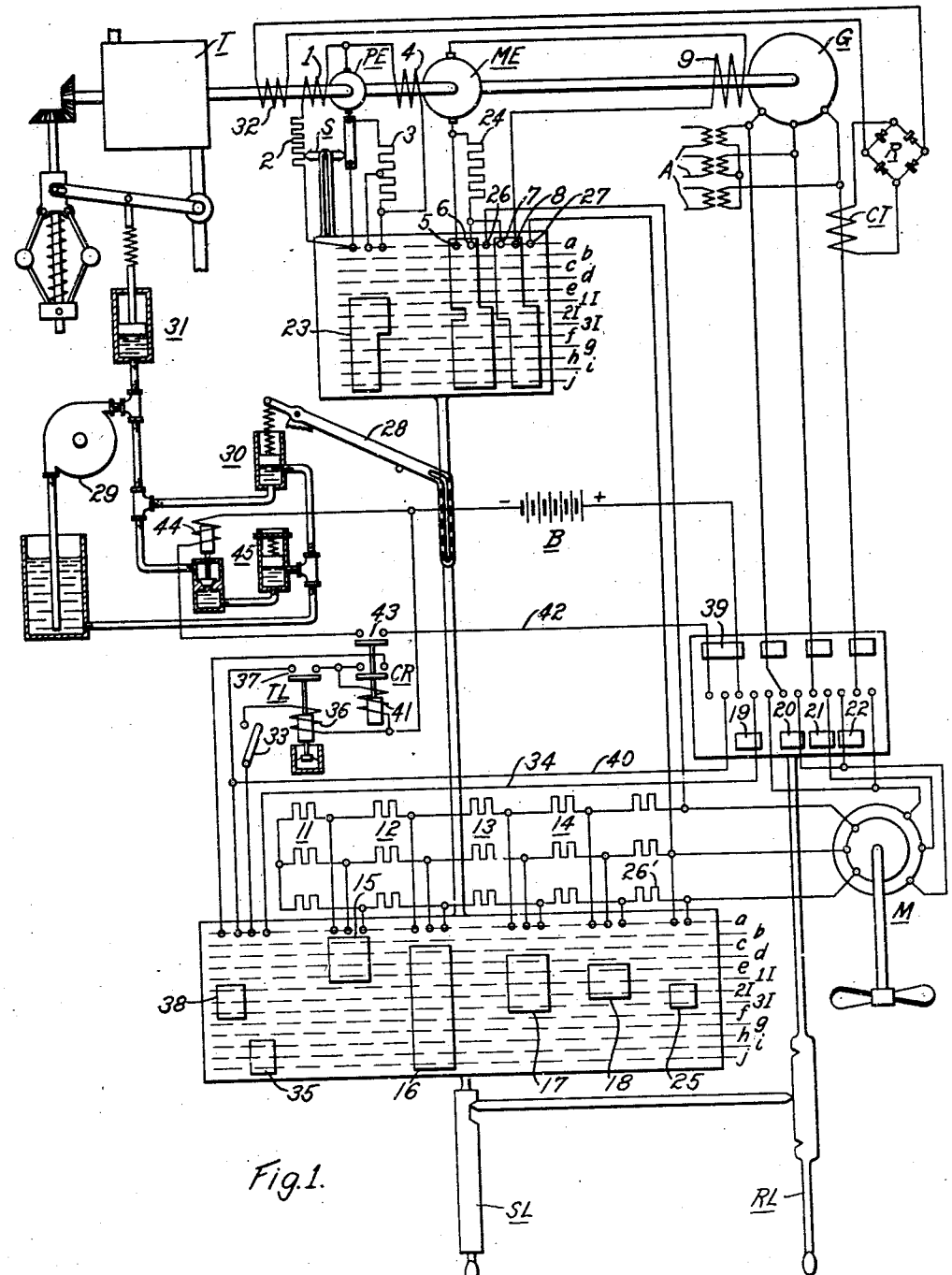
Figure 1 is a diagrammatic showing of one embodiment of our invention.

In Figure 1, T designates the turbine coupled (preferably through suitable gearing not shown for the sake of simplicity) to drive the pilot exciter PE, the main exciter ME, and the main generator G.

The turbine speed is controlled by an adjustable governor as shown. The governor adjustments are obtained through suitably controlled hydraulic means which will be described hereinafter.

The main generator G supplies the auxiliary A, which auxiliaries, for the type of vessel on which our control is of special advantage, constitute a considerable load and permit neither a shut down nor an appreciable change in the frequency of the alternating current supply, and supplies the main synchronous-induction motor M.

A synchronous-induction motor is a wound-rotor induction motor, which may be started, reversed, and run as such, but which also may be run as a synchronous motor by exciting, say one phase, of the rotor secondary, with direct current. For normal operating speeds of 75% to 100% of maximum propeller speeds, the motor will be run as a synchronous motor with 95% power factor, and the weight and dimensions of the motor will approximate those of a conventional salient pole synchronous motor. For lower speeds, required when maneuvering, the motor is run as a wound rotor induction motor and its speed will be controlled by varying the resistance of the secondary. The driving generator will be run at a relatively high speed as 75% of full speed.

The entire control is effected from the reversing lever RL and speed lever SL.

Probably the best understanding of our invention may be obtained from a study of typical operating cycles.

Assuming the turbine T is running at such a speed that the generator G is at 75% full speed and the circuits and other elements shown in Fig. 1 are all in the arrangement shown, then a number of circuits are completed. The pilot exciter PE will excite its own field 1 through substantially all sections of its rheostat 2 and will thus have a given desired voltage which is naturally, because of the 75% and the high field resistance, lower than this pilot exciter can develop. The pilot exciter armature is also connected through all the sections of the rheostat 3 to the field 4 of the main exciter ME. The voltage of this main exciter will thus also be at a desired but relatively low voltage.

The armature of the main exciter is directly connected through contact fingers 5, 6, 7 and 8 to the field 9 of the main generator G. The voltage of the generator G will thus be a maximum that may be had at 75% speed and the voltage will be sufficient for the many auxiliary loads supplied by this generator. The auxiliary loads are indicated by the leads A connected to suitable transformers connected to the output leads of the main generator as shown.

With the main generator thus operating at 75% of full speed, the main motor M for driving the propeller is energized and started by placing the reversing lever RL in either the "ahead" or the "astern" direction. In Fig. 1, the upward movement of lever RL is the "ahead" position whereas the downward movement is the "astern" position.

The various operating steps of most of our control is effected by the reversing lever RL and the speed lever SL. These two levers, as shown, are interlocked mechanically to prevent reversing or stopping unless the speed lever SL is placed in the low speed position. The various circuits shown may, in practice, be established through operation of magnetic contactors, or manually operable switches as shown.

Operation of the reversing lever RL upwardly moves the segments 19, 20, 21, and 22 to bridge the contact fingers in line with these segments. The segments 20, 21 and 22 connect the motor M for "ahead" operation, whereas the segment 19 merely closes a portion of an otherwise open circuit.

By moving the speed lever upwardly in successive steps, that is, from the first or a position shown successively to positions b, c, d and e, the resistor sections 11, 12, 13 and 14 are successively shunted by segments 15, 16, 17 and 18. The speed of motor M is increased. Before the speed can be raised further, the motor M must be synchronized. This transition is performed by three intermediate steps of the speed lever SL. These intermediate steps are designated 1I, 2I and 3I, respectively.

During induction motor operation, while the speed lever is moved through positions a, b, c, d to positon e, the motor follows successive speed torque curves such as shown in Fig. 2. In such manner the motor torque is equal to or greater than the propeller torque curve also shown in this Fig. 2.

When the speed lever is moved to the 1I position, the segment 23 shunts all the sections of rheostat 3 and the main exciter voltage builds up to a maximum for the speed at which the main exciter is operating. Since the voltage of the main exciter rises the voltage of the main generator G builds up. Before the voltage of the main generator can become excessive the speed lever is moved to position 2I.

In position 2I the shunting circuit at contact fingers 5 and 6 for resistor 24 is opened and this resistor is thus placed in the circuit of field 9 of the main generator G. The field excitation of the main generator is thus prevented from becoming excessive. Also for position 2I, the segment 25 shunts the last resistor section 26' in the secondary of the motor M and the motor thus speeds up to within a few percent below synchronous speed.

In position 3I the circuit is again established at contact fingers 5 and 6 to shunt the resistor 24. This means the generator field 9 is heavily excited and at the same time at contact fingers 6, 26 and 27, the circuit arrangement for field 9, is so changed that one phase of the secondary of motor M is connected in series with the field 9 thus heavily exciting both the generator and the motor with direct current and as a consequence the motor M will pull into synchronism. At the segment 25 the phase of the secondary of motor not being excited with direct current remains shunted for the time being to prevent any momentary loss of motor torque while the motor field is building up.

Connecting the generator field 9 and a phase of the motor secondary in series, as explained and shown, has the advantage of limiting the size of the exciter commutator, but synchronizing may be performed also with the two windings connected in parallel.

In the sixth, or f, position, segments 17 and 25 remove the shunting circuits for resistor sections 13 and 26' and since the segment 18 opened, the shunting circuit for resistor section 14 in the 3I position, the resistor sections 13, 14 and 26', having a rather high total resistance value, are inserted in the secondary circuit. This will give some damping effect. At the same time more sections of the resistor 3 are inserted in the circuit of the field 4 of the main exciter thus reducing the exciter voltage back to normal.

As the speed lever SL is moved successively to positions f, g, h, i and j, the slidable lead S for rheostat 2 is actuated to increase the excitation of the pilot exciter PE proportional to changes in speed so that the excitation is correct for each speed. The changes in speed are effected by the actuation of the lever 28 which, as shown, is changed only during synchronous motor operation, that is, for these last five speed lever positions.

The impeller 29 is operated at constant speed by any suitable means (not shown) so that its output pressure for any given position of lever 28 is constant. The governor adjusting means are thus held in a given position and the turbine T will have a constant speed. This speed will be 75% of full speed when all the parts are in the positions shown, and will remain at this speed for the first eight speed lever positions. As the lever 28 is moved counterclockwise the valve 30 restricts the flow of liquid from the impeller 29 more and more and will raise the pressure under piston 31. The governor setting is thus changed. When the speed lever SL is in the *j* position, the turbine will be operating at 100% speed.

When the speed lever is in the *a* position, the reversing lever RL is released by the mechanical interlock and may also be moved to the "astern" position. When this is done and the speed lever is operated the sequence will be the same as hereinbefore discussed for the "ahead" operation.

Regardless of the direction of operation of the ship stability of control is obtained by means of a current transformer CT and a rectifier R which energizes a booster field 32 on the pilot exciter PE so that the voltage of this exciter is increased with any rise of motor armature current. The pull-out torque of the motor is thus always kept at a safe margin above the propeller torque. Other methods for stability control used for normal synchronous motor operation may, of course, be applied.

For normal relatively slow reversing operation, the speed of the generator will be reduced to 75% of normal during this period. When, however, it is desired to reverse the propeller more rapidly while the vessel is moving at full speed ahead, the torque required will be increased to such an extent that it would necessitate an increase in the size of both the motor and generator to develop the required torques if the generator is turning at a speed, say, as high as 75% of normal.

For this reason, we propose to decrease the speed of the generator further (preferably to approximately 55% of full speed) during emergency reversals from full speed ahead. This low speed will have to be maintained only for a comparatively short period (maximum of 30 seconds) until the forward motion of the vessel and consequently the reversing torque has been reduced sufficiently to permit increased generator speeds.

While we often refer to specific percentages of speed torque, etc. and also to specific values of time, it is to be understood that such values are merely illustrative. The specific values may be changed and usually will differ for different sized vessels and the equipment on it.

In Fig. 3, the torques during reversal from full speed ahead are shown, assuming that the generator speed is reduced to 55% of full speed. It is important that the motor torque, on one of the speed positions, is higher than the hump shown in the propeller torque curve at approximately 40% forward propeller speed, as reversal otherwise could not take place until the vessel slowed down sufficiently to reduce the hump.

In normal slow reversal the speed lever SL is moved at ample time intervals from the *j* position to the *a* position, at which position the generator speed is still 75% and the reversing lever RL is again free to be operated, and after operation of the reversing lever the speed lever is again moved forward.

When rapid, or emergency, reversing is to be effected the sequence is different. Assuming the vessel is moving at full speed ahead then, for rapid reversal, the switch 33 is closed. A circuit is then established from the positive terminal of the battery B through segment 19 of the reversing switch, conductor 34, segment 35 of the speed lever, switch 33, coil 36 of the time limit relay TL to the negative terminal of the battery.

Time limit relay picks up immediately to close contact members 37. This relay TL has the property of maintaining the contact members 37 closed for a relatively long time, as a half minute after being deenergized. As the speed lever is moved toward position *a*, the circuit for coil 36 is broken at segment 35 as the lever leaves the *h* position, but contact members 37 will remain closed for a definite time.

A moment later the lever passes through positions 3I, 2I and 1I in the order named but no significant circuits are established, though segment 38 temporarily engages the contact fingers disposed to cooperate with it.

When the speed lever is moved to the *a* position, the reversing lever is thrown to the "astern" position. A circuit is immediately established at segment 39. This circuit may be traced from the positive terminal of the battery B through segment 39, conductor 40, contact members 37, coil 41 of the control relay CR to the negative battery terminal.

Operation of relay CR, which takes place in an instant after its energization, establishes a circuit from battery B through segment 39, conductor 42, contact members 43, valve actuating coil 44 to the negative battery terminal.

The valve actuated by coil 44 immediately opens and the pressure in the liquid circulating system for controlling the governor setting immediately drops to a value determined by the valve 45. Since the speed control setting of valve 45 is much lower than the lowest speed valve 30 permits, valve 30 will close completely for the time being. The plunger in the governor adjusting piston 31 drops and the turbine speed is, almost instantly adjusted for a low speed, say 55% of full speed.

The speed lever is now moved toward synchronous operation and when the speed lever is in the first intermediate position 1I, the energization of the relay CR becomes independent of the timing relay TL by the circuit established by segment 38. This circuit may be traced from energized conductor 40 through segment relay 38 through the contacts of CR to the coil 41 and thence to the battery. It is thus apparent that the low, or 55% speed will be maintained for all the intermediate positions.

All the other functions of the control remain the same which means that synchronization takes place at position 3I with forced field excitation and thus heavy pull-in torque but at 55% generator speed.

As soon as the speed lever is moved to the *f* position, the coil 44 is deenergized and valve 45 is taken out of service. The speed setting is thus again determined by the valve 30. The sequence for positions *f*, *g*, *h*, *i*, and *j* is the same as above described with a normal synchronous operation of the motor M.

For some vessels, it may not be necessary to synchronize in the "astern" direction, in which case the speed lever movement is stopped at the *e* position. If the reversal just prior to this type of operation was an emergency, or rapid, reversal the turbine speed will change from 55% speed to 75% speed when contact members 37 open, otherwise the speed will be and stay at 75% full speed. The time of opening of the contact members 37 is so adjusted as to prevent stalling when the speed lever, during an emergency reversal, is not moved beyond position *e*.

The control switch 33 when open positively prevents unnecessary drop in turbine speed during frequent reversals while maneuvering near a dock.

In Fig. 6 a salient-pole synchronous motor is schematically shown. The insulated conductor bars 100 disposed in the pole faces are brought out to slip rings 101, 102, and 103 and the operating torque during induction motor operation may be varied by resistors, such as resistors 11, 12, etc., connected to the slip rings. The direct current field 104 may be a low resistance winding supplied by direct current, as exciter ME, to slip rings 105 and 106.

The specific circuit arrangements shown and described are merely illustrative of our invention and are not to be taken in a limiting sense. Our invention is only to be limited by the claims hereto appended.

We claim as our invention:

1. In a power system for a ship on board of which both the auxiliaries, representing a relatively larger percentage of the total load than usual, and the propulsion equipment are supplied from a single relatively large alternator, in combination, a prime mover, a governor for controlling the speed of the prime mover, hydraulic means for adjusting the governor so that the prime mover may operate at any selected speed, said hydraulic means being normally so adjusted that the prime mover operates in the neighborhood of 75% of full speed, an alternator coupled to the prime mover and thus normally operated to produce a frequency of its generated alternating current in the neighborhood of 75% of full frequency, a synchronous-induction motor coupled to the alternator, means for varying the synchronous-induction motor speed from starting to within a selectively small percentage of the synchronous speed at the adjusted alternator frequency, means for synchronizing said motor, said means including means for varying the excitation of the alternator and the motor to effect synchronization with a high pull-in torque, means operable after synchronization for changing the adjustment of the governor to increase the speed of the alternator so as to produce a normal, or full speed, frequency to thus further increase the motor speed, and means responsive to the motor load current for varying the excitation of either or both the generator and motor to effect stable operation regardless of variations of the torque on the motor.

2. In a ship propulsion system, in combination, a prime mover, an alternator coupled to said prime mover, a synchronous-induction motor for driving the ship propeller, means for connecting said alternator to said synchronous-induction motor, means for governing the operation of the prime mover to maintain the speed constant at a given relatively high value with reference to the full speed of the prime mover, control means for effecting operation of the synchronous induction motor as an induction motor and varying the speed thereof from any low value to within a few percent of synchronous speed at the constant alternator speed determined by the selected constant speed of the prime mover, means for synchronizing the synchronous-induction motor with a high pull-in torque, means providing for an exciting component for the alternator proportional to the load current of the alternator to thus maintain stable operation with varying torques on the motor, and means for adjusting the prime mover speed from the said constant speed to full speed.

3. In a power system for a ship on board of which both the auxiliaries, representing a relatively larger percentage of the total load than usual, and the propulsion equipment are supplied from a single relatively large alternator, in combination, a prime mover, a governor for controlling the speed of the prime mover, adjustable means for adjusting the governor so that the prime mover may operate at any selected speed, said governor adjusting means being normally so adjusted that the prime mover operates in the neighborhood of 75% of full speed, an alternator coupled to the prime mover and thus normally operated to produce a frequency of its generated alternating current in the neighborhood of 75% of full frequency, a synchronous-induction motor coupled to the alternator, means for varying the synchronous-induction motor speed from starting to within a relatively small percentage of the synchronous speed at the adjusted alternator frequency, means for synchronizing said motor with a high pull-in torque, means operable after synchronization for changing the adjustment of the governor to increase the speed of the alternator so as to produce a normal, or full speed, frequency to thus further increase the motor speed, and means responsive to the motor load current for varying the excitation of either or both the generator and motor to effect stable operation regardless of variations of the torque on the motor.

4. A prime mover, an adjustable governor for the prime mover adjusted to maintain the prime mover at some constant speed above 50% of normal full speed and below 85% of normal full speed, an alternator coupled to be driven by the prime mover to thus generate an alternating current having a given substantially constant frequency determined by the speed selected for the prime mover, a synchronous-induction motor, a reversing lever for connecting the said motor to the alternator for either "ahead" or "astern" operation or no operation, a speed lever interlocked with the reversing lever to be operative only when the reversing lever is either in "ahead" or "astern" position, means responsive to the speed lever, when the reversing lever is in either the "astern" or "ahead" position, for accelerating the synchronous induction motor as an induction motor to near synchronous speed for the particular frequency of alternating current supplied by the alternator when operating at the speed determined by the speed selected for the prime mover, means responsive to the speed lever for synchronizing the motor, and means responsive to the speed lever for changing the governor adjustment so as to operate the prime mover at full speed, whereby the motor speed is brought up to full speed.

5. In a power system for a ship on board of which the electric auxiliaries, which auxiliaries represent a relatively larger percentage of the total load than usual, and the electric propulsion equipment are supplied from a single relatively large alternator, in combination, a prime mover, an adjustable governor for the prime mover adjusted to maintain the prime mover at some constant speed above 50% of normal full speed and below 85% of normal full speed, an alternator coupled to be driven by the prime mover to thus generate an alternating current having a given substantially constant frequency determined by the speed selected for the prime mover, a synchronous-induction motor, a reversing lever for connecting the said motor to the alternator for either "ahead" or "astern" operation or no operation, a speed lever interlocked with the reversing lever to be operative only when the reversing lever is either in "ahead" or "astern" position, means responsive to the speed lever, when the reversing lever is in either the "astern" or "ahead" position, for accelerating the synchronous-induction motor as an induction motor to near synchronous speed for the particular frequency of alternating current supplied by the alternator when operating at the speed determined by the speed selected for the prime mover, means responsive to the speed lever for synchronizing the motor, and means responsive to the speed lever for changing the governor adjustment so as to operate the prime mover at full speed, whereby the motor speed is brought up to full speed, and means for exciting the alternator and the motor as a function of the load current of the motor to thus provide stable synchronous motor operation regardless of the changes in torque on the motor.

LEE A. KILGORE.
ERLING FRISCH.